United States Patent
Nomura

(10) Patent No.: US 11,475,679 B2
(45) Date of Patent: Oct. 18, 2022

(54) ROAD MAP GENERATION SYSTEM AND ROAD MAP GENERATION METHOD

(71) Applicant: DENSO CORPORATION, Kariya (JP)

(72) Inventor: Toshio Nomura, Kariya (JP)

(73) Assignee: DENSO CORPORATION, Kariya (JP)

( * ) Notice: Subject to any disclaimer, the term of this patent is extended or adjusted under 35 U.S.C. 154(b) by 322 days.

(21) Appl. No.: 16/899,094

(22) Filed: Jun. 11, 2020

(65) Prior Publication Data
US 2020/0302191 A1 Sep. 24, 2020

Related U.S. Application Data

(63) Continuation of application No. PCT/JP2018/037041, filed on Oct. 3, 2018.

(30) Foreign Application Priority Data

Dec. 15, 2017 (JP) .............................. JP2017-240642

(51) Int. Cl.
| | |
|---|---|
| G06K 9/00 | (2022.01) |
| G06V 20/56 | (2022.01) |
| G01C 21/32 | (2006.01) |
| G06V 10/30 | (2022.01) |
| G09B 29/00 | (2006.01) |

(52) U.S. Cl.
CPC .......... *G06V 20/588* (2022.01); *G01C 21/32* (2013.01); *G06V 10/30* (2022.01); *G09B 29/003* (2013.01)

(58) Field of Classification Search
CPC ...... G06V 20/588; G06V 10/30; G01C 21/32; G01C 21/3602; G01C 21/3804; G09B 29/003; G09B 29/106; G06T 7/00
USPC .......................................... 382/103; 370/388
See application file for complete search history.

(56) References Cited

U.S. PATENT DOCUMENTS

2019/0056748 A1* 2/2019 Budihal .................... G06T 7/11

FOREIGN PATENT DOCUMENTS

JP 2009223221 A 10/2009

\* cited by examiner

*Primary Examiner* — Marcos Batista
(74) *Attorney, Agent, or Firm* — Harness, Dickey & Pierce, P.L.C.

(57) ABSTRACT

A road map generation system is provided that collects camera image data of road conditions captured during traveling of vehicles on roads and generates road map data based on the camera image data. The system performs image processing on the collected camera image data to convert into orthographic images and to combine the orthographic images to generate a combined image. The system extracts a defective portion of a road marking on a road from the combined image and performs a determination of whether the defective portion of the road marking is due to noise at the image processing of the image processing device or there is a defect in the real world. When the defective portion of the road marking is due to the noise at the image processing, the system performs a correction process of the road marking.

10 Claims, 6 Drawing Sheets

ROAD MAP GENERATION SYSTEM AND ROAD MAP GENERATION METHOD

CROSS-REFERENCE TO RELATED APPLICATIONS

This application is a continuation application of PCT/JP2018/037041 filed on Oct. 3, 2018, which designated the U.S. and claims the benefit of priority from Japanese Paten Application No. 2017-240642 filed on Dec. 15, 2017. The entire disclosures of all of the above applications are incorporated herein by reference.

TECHNICAL FIELD

The present disclosure relates to a road map generation system and a road map generation method that generate road map data based on camera image data.

BACKGROUND

There is a system in which a road surface imaging system mounted to a vehicle images a road surface during traveling on a road and a road map including road surface markings is generated from the images.

SUMMARY

The present disclosure provides a road map generation system and a road map generation method.

In an example of the present disclosure, a road map generation system collects image data of road conditions and generates road map data based on the image data. The system performs image processing on the collected image data to generate a combined image. The system extracts a defective portion of a road marking on a road from the combined image. The system performs a determination of whether the extracted defective portion of the road marking is due to noise at the image processing or an occurrence of a defect in the real world. When the defective portion of the road marking is due to the noise at the image processing, the system performs a correction process of the road marking.

In an example of the present disclosure, a road map generation method collects image data of road conditions and generates road map data based on the image data. The method includes: performing processing on the collected image data and generate a combined image; extracting a defective portion of a road marking on a road from the combined image; performing a determination of whether the extracted defective portion of the road marking is due to noise at the image processing or an occurrence of a defect in the real world; and performing a correction process of the road marking when the defective portion of the road marking is due to the noise at the image processing.

BRIEF DESCRIPTION OF DRAWINGS

Objects, features and advantages of the present disclosure will become more apparent from the following detailed description made with reference to the accompanying drawings. In the drawings.

DETAILED DESCRIPTION

Figure 1:
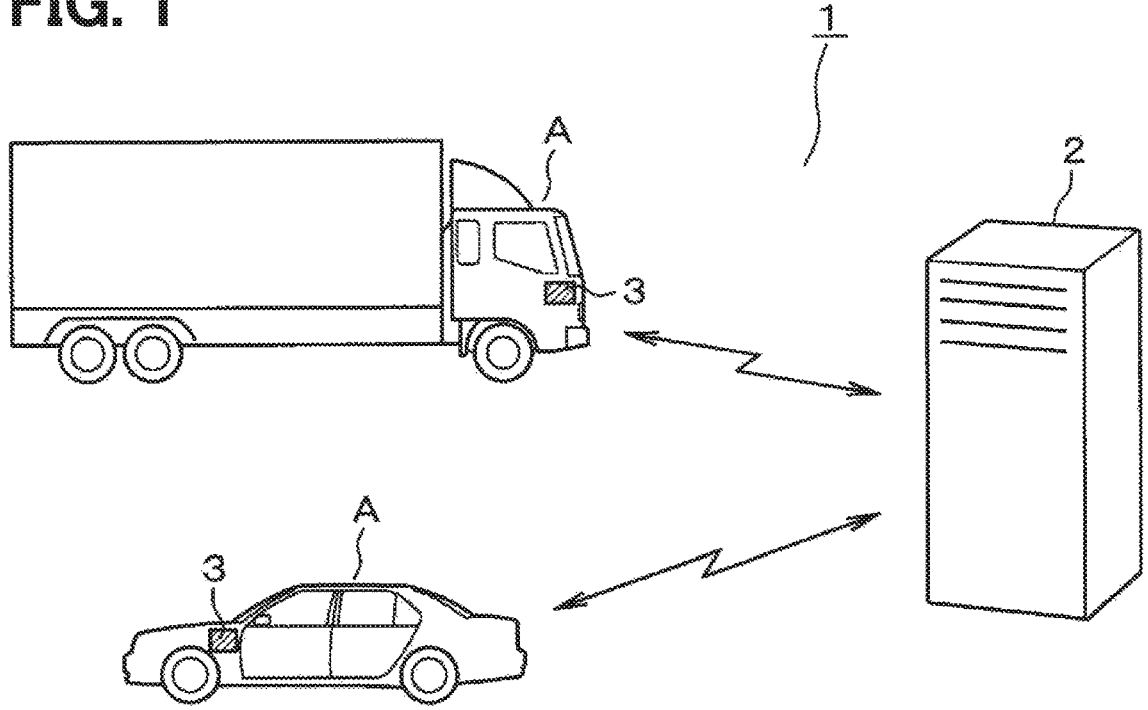
FIG. 1 is a diagram illustrating an embodiment and schematically illustrating an overall configuration of a system.

The present disclosure relates a road map generation system and a road map generation method that collect, from a plurality of vehicles equipped with vehicle cameras, camera image data obtained by imaging road conditions during traveling of these vehicles, and that generate road map data based on the camera image data.

There is a system in which a road surface imaging system mounted to a vehicle images a road surface during traveling on a road and a road map including road surface markings is generated from the images. In this system, the images captured by the camera are converted into orthographic images viewed from directly above having road markings, and multiple orthographic images of the surrounding are combined to obtain a combined image so that the road markings have an appropriate positional relationship. This system may perform a process of correcting erroneous recognition of road surface markings also.

In recent years, an automatic driving technology for automobiles is developing for its realization, and there are needs to produce and maintain highly accurate road map data.

In the above system, a process of correcting a road marking to straight one may be performed when, for example, a paint representing a centerline of the road or a lane boundary line is distorted. In this regard, it is conceivable that a road condition is bad and the paint is actually distorted. For this reason, if the road marking is simply corrected, accurate road map data reflecting the real world may not be obtained in some cases. In these case, in roads where the road conditions are bad such as roads where the paint is actually erased, no-execution of the automated driving leads to safety and secure, and therefore, it is preferable to obtain accurate road map data reflecting the real world.

It is an object of the present disclosure to provide a road map generation system and a road map generation method that generate road map data based on collecting camera image data of vehicle cameras and that can generate the accurate road map data that truly reflects road conditions in the real world.

In a first aspect of the present disclosure, from a plurality of vehicles equipped with vehicle cameras, a road map generation system collects camera image data obtained by imaging road conditions during traveling of the vehicles and generates road map data based on the camera image data. The system comprises: an image processing device that performs image processing on the collected camera image data to convert into orthographic images viewed from directly above and to combine the orthographic images to generate a combined image; an extraction device that extracts a defective portion of a road marking on a road from the combined image; a determination device that performs a determination of whether the defective portion of the road marking is due to noise at the image processing of the image processing device or an occurrence of a defect in the real world; and a correction device that, based on a result of the determination by the determination device, performs a correction process of the road marking when the defective portion of the road marking is due to the noise at the image processing.

With this, when the camera image data obtained by imaging the road conditions during traveling of the vehicles are collected from the plurality of vehicles, the image processing device performs the image processing on the collected camera image data to perform conversion into orthographic images viewed from directly above. Further, a plurality of orthographic images are combined to generate a combined image. In cases where the extraction device extracts a defective portion of a road marking on a road from the combined image, the determination device determines whether the defective portion of the road marking is due to noise at the image processing of the image processing device or an occurrence of a defect in the real world. Then, based on a result of the determination by the determination device, the correction device performs the correction process of the road marking when the defective portion of the road marking is due to the noise at the image processing.

In the above, performing the correction of the defective portion of the road marking by the correction device may be limited to cases where it is determined by the determination device that the defective portion of the road marking is due to the noise at the image processing of the image processing device. When it is determined by the determination device that there is the occurrence of the defect in the real world, the correction is not performed. As a result, in generating road map data based on collecting camera image data of vehicle cameras, it is possible to provide such lent effects that accurate road map data truly reflecting road conditions in the real world is generable.

Hereinafter, with reference to the drawings, an embodiment will be described. FIG. 1 schematically illustrates an overall configuration of a road map generation system 1 according to an embodiment. The road map generation system 1 includes a data center 2 for collecting and analyzing camera image data and generating road map data, and a group of vehicles A for traveling on roads. Specifically, the vehicle group A may include general automobiles of any type such as passenger cars and trucks.

Figure 2:
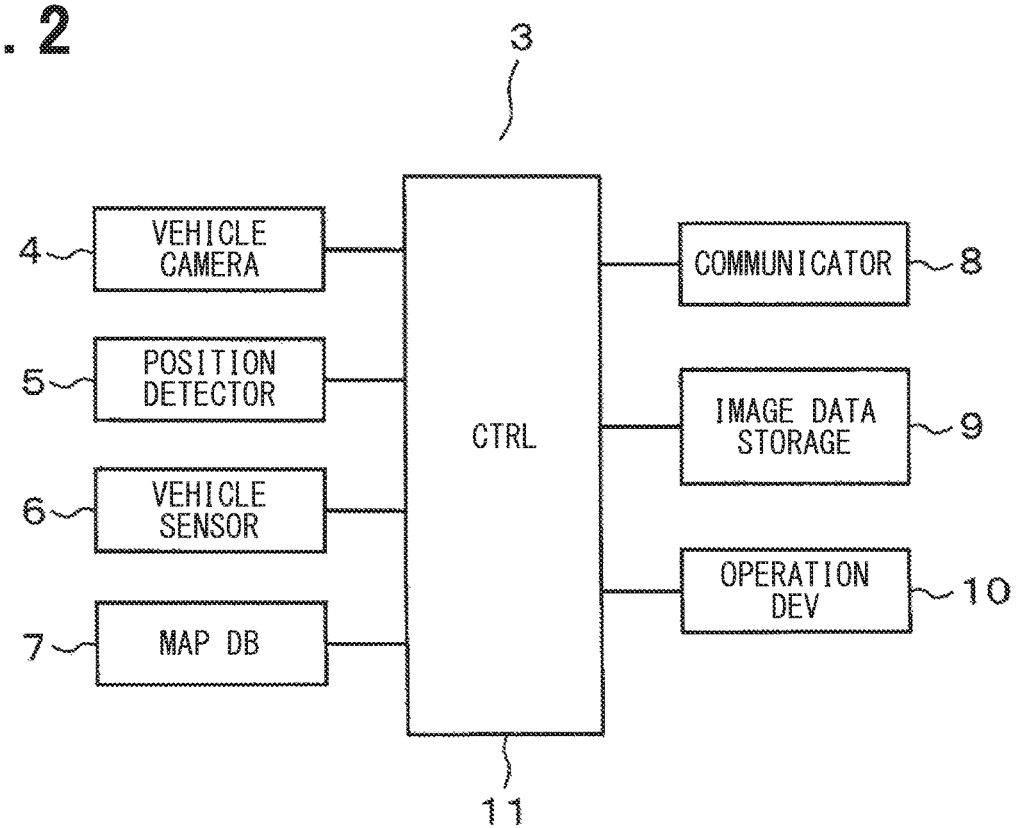
FIG. 2 is a block diagram schematically illustrating a configuration of a vehicle-mounted device.

A respective vehicle A is equipped with a vehicle-mounted device 3 for implementing the road map generation system 1. As shown in FIG. 2, the vehicle-mounted device 3 includes a vehicle-mounted camera 4, a position detector 5, various vehicle-mounted sensors 6, a map database 7, a communicator 8, an image data storage 9, an operation unit 10, and a control unit 11. The vehicle-mounted camera 4 is provided at, for example, a front portion of the vehicle A and is configured to image at least a road condition in the front in the traveling direction. The position detector 5 detects position of the vehicle based on data received with a known GPS receiver and the like. The various vehicle-mounted sensors 6 detect speed information of the subject vehicle, traveling direction information, and the like. The vehicle-mounted cameras 4 may be provided at front and rear portions and at left and right portions of the vehicle A. Further, as a type of the vehicle-mounted camera 4, it is possible to employ a wide field of view camera, and in particularly it may be preferable to use a binocular or more multiple eye camera as the front camera.

The map database 7 stores, for example, nationwide road map information. The communicator 8 communicates with the data center 2 via a mobile communication network or via vehicle-to-infrastructure communications or the like. The image data storage 9 stores the camera image data captured by the vehicle-mounted camera 4 in association with such data as a vehicle position, a traveling speed, a traveling direction, and a photographing date and time. The operation unit 10 includes a switch and a display unit (not shown), and a user (driver) of the vehicle A performs necessary operations to the operation unit 10.

The control unit 11 includes a computer and performs overall control of the vehicle-mounted device 3. In this case, the control unit 11 causes the vehicle-mounted camera 4 to constantly image the road condition in front of the vehicle A during the traveling of the vehicle A, and stores the camera image data in the image data storage 9 together with the vehicle position data and the like. For example, at regular time intervals such as once a day, the control unit 11 causes the communicator 8 to transmit the camera image data stored in the image data storage 9 to the data center 2.

Figure 3:
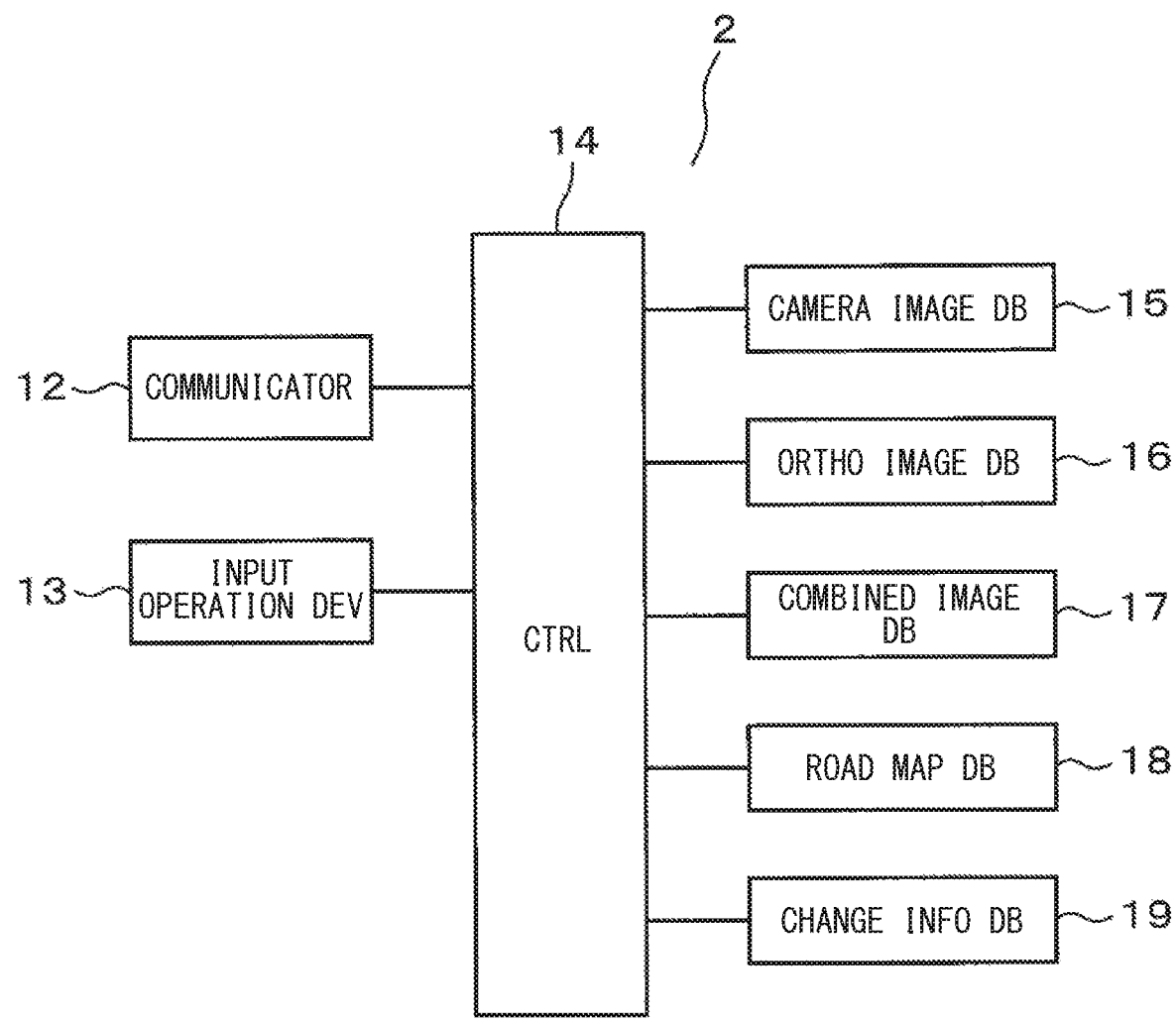
FIG. 3 is a block diagram schematically illustrating a main configuration of a data center.

As shown in FIG. 3, the data center 2 includes a communicator 12, an input operation unit 13, a processing control unit 14, a camera image database 15, an orthographic image database 16, a combined image database 17, a road map database 18, and a change information database 19. Among them, the communicator 12 receives the camera image data via communications with the communicator 8 of each vehicle A. The input operation unit 13 is for an operator to perform necessary input operations.

The processing control unit 14 mainly includes a computer and performs overall control of the data center 2. Further, as will be described later in detail, the processing control unit 14 executes processing such as processing of generating road map data and processing of storing and accumulating a change in road marking. The camera image data transmitted from individual vehicles A are collected and stored in the camera image database 15. In this case, a huge amount of camera image data is collected from, for example, general vehicles A traveling all over Japan.

In the road map data generation processing executed by the processing control unit 14, orthographic image data are stored in the orthographic image database 16, and combined image data are stored in the combined image database 17. Further, the generated highly accurate road map data are stored in the road map database 18. Further, in the present embodiment, in the processing of storing and accumulating the change in the road marking executed by the processing control unit 14, latest (current) change information of the road marking are accumulated and stored in the change information database 19.

As will be described later in the description of the operation (flowchart description), the processing control unit 14 of the data center 2 in the present embodiment sequentially executes the following processes when performing the processing of generating road map data. Specifically, first, the processing control unit 14 performs image processing on the camera image data stored in the camera image database 15 to perform conversion into orthographic images viewed from directly above. Further, the processing control unit 14 executes a process (image processing step) of generating a combined image by aligning and connecting a plurality of orthographic images.

Next, the processing control unit 14 executes a process (extraction step) of extracting a defective portion of a road marking on the road from the combined image. Next, the processing control unit 14 executes a process (judgment step) of judging whether the defective portion of the extracted road marking is due to noise in the image processing step or whether there is a defect in the real word. Then, based on the determination result, the processing control unit 14 executes a process (correction step) of correcting the road marking when the defective portion of the road marking is due to the noise at the image processing.

In the process of extracting the defective portion of the road marking on the road from the combined image, the processing control unit 14 in the present embodiment extracts a lacking portion and/or a distorted portion of a marking line painted on the road as the defective portion of the road marking. Further, in performing the process of correcting the road marking, the processing control unit 14 performs the correction on the lacking portion or the distorted portion of the marking line so as to provide smooth connection when the defective portion of the road marking is due to the noise at the image processing. The term "marking line" as used herein refers to a lane marking such as a road center line, a lane boundary line, a road boundary line, a lane definition line of a vehicle lane, and to various lines such as a stop line, a pedestrian or bicycle crossing and the like, and may be typically painted on a road in white.

In addition to the above, the processing control unit 14 executes a process of storing and accumulating a change in the road marking. In the process of storing and accumulating the change in the road marking, the processing control unit 14 executes a process (detection step) of detecting an occurrence of a change in the road marking over time at a same location, from the camera image data stored in the camera image database 15. When the change in the road marking is detected, the processing control unit 14 executes a process (storage process) of storing and accumulating change information in the change information database 19.

In the above, in detecting the occurrence of the change in the road marking over time at the same location from the camera image data, the processing control unit 14 detects the below-described pattern of a change in the road marking. Specifically, at least one of a tire slip trace on the road, re-paving, partial depression or bump, cracking, and abnormality due to a disaster occurrence is detected as the pattern of the change. In response to detecting the change in the road making corresponding to any of the patterns of the change, the processing control unit 14 stores and accumulates the change information of this change in the change information database 19. The change information stored in the change information database 19 includes data of the road location, the pattern of the change, the date and time, corresponding camera images (see FIGS. 7A to 7C) and the like.

In the road map data generation processing, the processing control unit 14 performs a determination of whether the extracted defective portion of the road marking is due to the noise at the image processing process or an occurrence of a defect in the real world. To perform the determination, the processing control unit 14 refers to the change information accumulated in the change information database 19. Specifically, at a location where the defective of the road marking (marking line) is extracted, when no change information is present in the change information database 19, it is determined that the defective of the road marking at the corresponding road location is due to the noise at the image processing. When the change information exists in the change information database 19, it is determined that there is the occurrence of the defect in the real world.

With this, necessary correction is performed on the combined image, and latest, highly accurate road map data is generated based on the combined images and stored in the road map database 18. Although not shown, the data center 2 in the road map generation system 1 of one embodiment is configured to provide the generated latest road map data and the like to an outside. For example, the data center 2 provides traffic information to a dynamic information center and/or provides the highly accurate road map data for automated driving map suppliers, car manufacture or the like.

Figure 4:
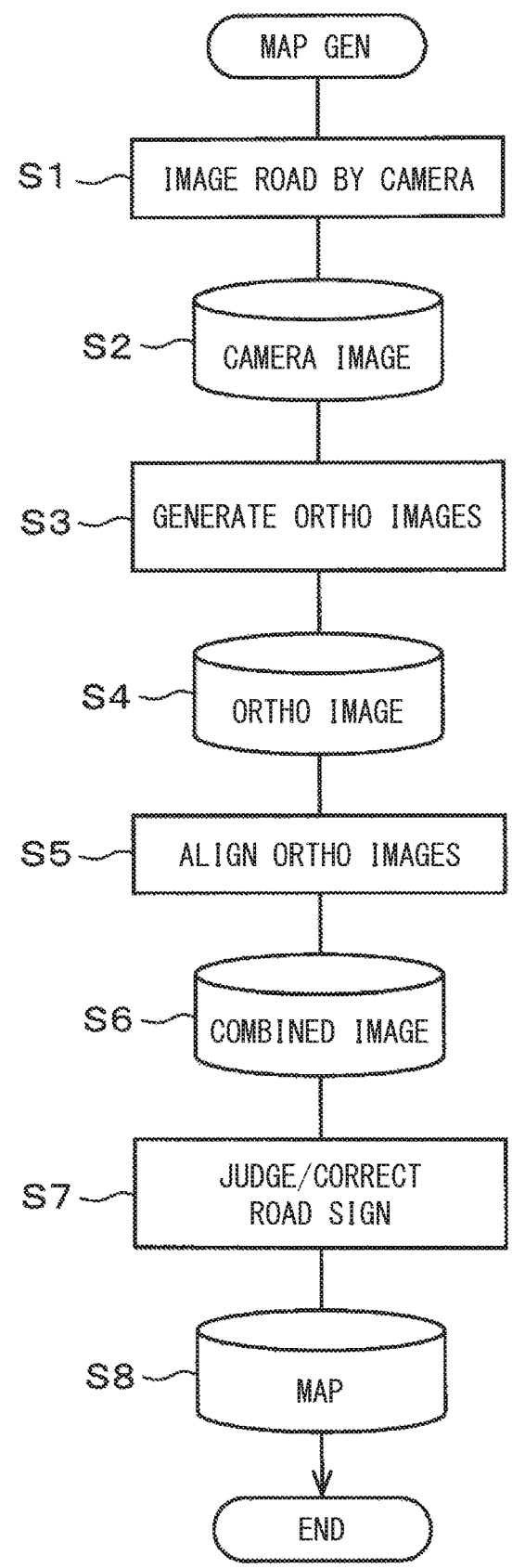
FIG. 4 is a flowchart schematically illustrating a procedure of generating map data by a processing control device.
Figure 5:
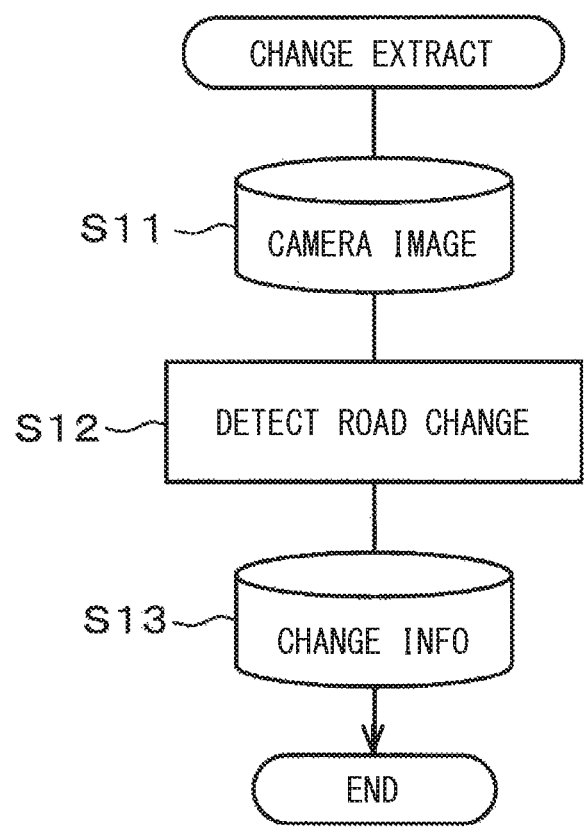
FIG. 5 is a flowchart schematically illustrating a procedure of storing and accumulating changes in road markings by a processing control device

Next, operation of the road map generation system 1 having the above configuration will be described with reference to FIGS. 4 to 7C. The flowchart of FIG. 4 illustrates a procedure of generating the road map mainly executed by the processing control unit 14 of the data center 2. The flowchart of FIG. 5 illustrates a procedure of storing and accumulating the changes in road markings, which is executed by the processing control unit 14. In the flowchart of FIG. 5, first, in step S11, the camera image database 15 is accessed to read the camera image data. In the next step S12, a process (detection step) of detecting the temporal change in the road marking from the camera image data is performed.

The road marking is normal in its initial state such as, for example, at a time of paving the road or repainting the road marking. If a defect occurs in the road marking, this is considered to be due to a change in the road making over time after the initial state. In the present embodiment, as described above, at least one of the occurrence of a tire slip trace on the road, re-paving, partial depression or bump, cracking, and an abnormality due to disaster is detected as a pattern of the change in the road marking. In response to detection of the change in the road marking, a process (storage step) of writing the change information into the change information database 19 is performed in step S13. In this way, the change information is stored and accumulated in the change information database 19.

Figure 7A:
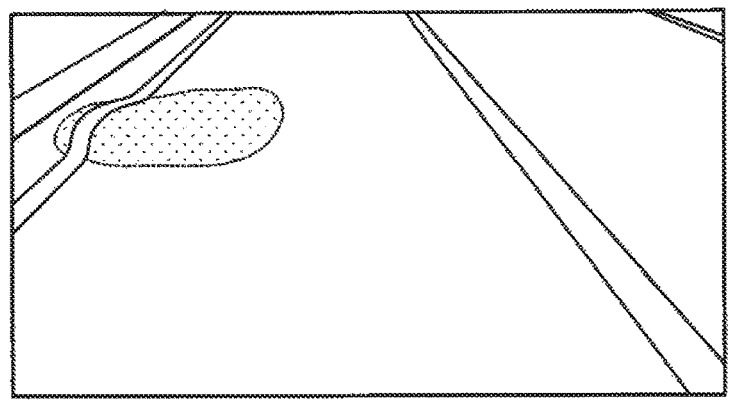
FIG. 7A is a diagram illustrating a first example of road marking change.
Figure 7B:
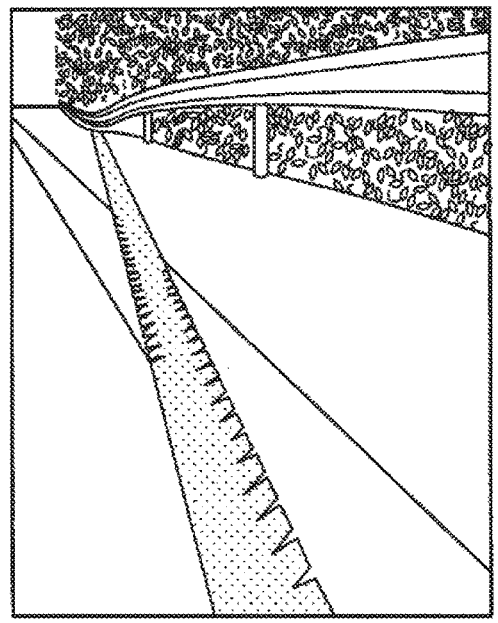
FIG. 7B is a diagram illustrating a second example of road marking change
Figure 7C:
FIG. 7C is a diagram illustrating a third example of road marking change

FIGS. 7A to 7C illustrate examples of patterns of images in cases of occurrences of changes in road markings. FIG. 7A illustrates an occurrence of a partial bump (unevenness) due to backfilling after road construction, in which the marking line (lane marking) is distorted. FIG. 7B illustrates a state in which a portion of the lane marking disappears due to the tire slip trace on the road. FIG. 7C illustrates a situation in which a disaster (collapse of a slope) causes sediment to accumulate and fill up on part of the road including the marking line. By providing these patterns of changes in advance, it becomes possible to easily detect the changes from the camera images.

Figure 6A:
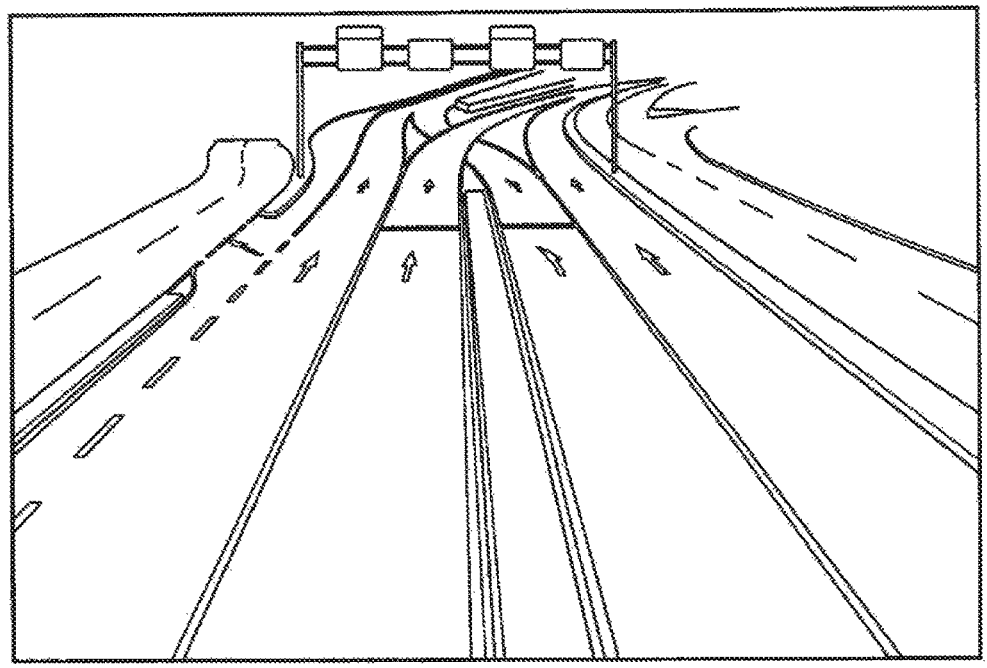
FIG. 6A is a diagram for explaining image processing.

Next, in the flowchart of FIG. 4 illustrating the procedure of generating road map data, first, in step S1, the vehicle-mounted camera 4 in the vehicle-mounted device 3 of a respective vehicle A captures an image of the traveling road. In the next step S2, the data of the camera images captured by respective vehicles A are collected in the data center 2 and written into the camera image database 15. An example of the camera image in this case is shown in FIG. 6A. The step S1 is executed under the control of the control unit 11 in a respective vehicle A.

In the step S2, the camera image data is transmitted from a respective vehicle A to the data center 2 by the communicator 8, and the camera image data received via the communicator 12 in the data center 2 is written into the camera image database 15 under the control of the processing control unit 14. In this case, the latest camera image data of roads nationwide are collected from a large number of general vehicles A traveling on the roads nationwide.

Steps S3 to S6 are steps of the image processing executed by the processing control unit 14. In step S3, the camera images are read from the camera image database 15, and a respective frame image is converted into a state viewed from directly above and thereby the orthographic image is generated. In step S4, the generated orthographic images are written into the orthographic image database 16. In the next step S5, a plurality of generated orthographic images are aligned along the corresponding travel trajectories of the vehicles A and are connected (fitted together) and thereby the combined image is generated. In step S6, the generated combined image is written into the combined image database 17. An example of the combined image is shown in FIG. 6B.

In step S7, a process of recognizing the road marking on the road from the generated combined image and correcting the road marking on an as-needed basis is performed. More specifically, an extraction process (extraction step) of extracting a defective portion of the road marking on the road from the combined image is executed. Next, a determination process (determination step) of determining whether the defective portion of the road marking is due to the noise at the image processing of the image processing step or there is a defect in the real world is performed. Further, based on the determination result, a process (correction step) of correcting the road marking is performed in cases where the defective portion of the road marking is due to the noise at the image processing.

Figure 6B:
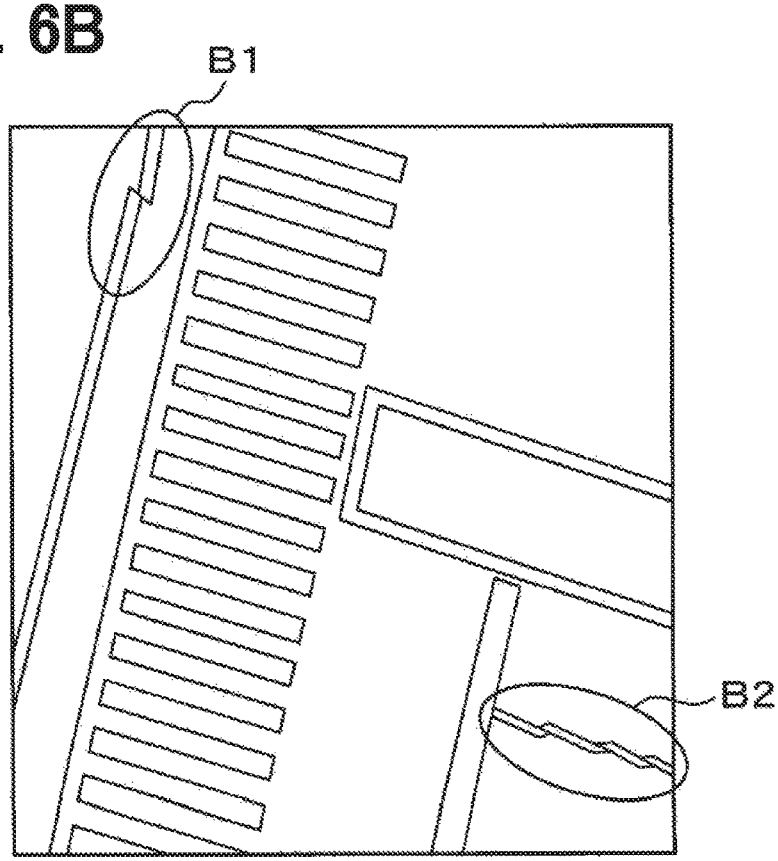
FIG. 6B is a diagram for explaining image processing.

As illustrated in FIG. 6B by the reference sign B1, the defect of the road marking includes a case where a stop line which should be a straight line is distorted to have a lateral displacement in the middle. Further, as illustrated in FIG. 6B by the reference sign B2, there is a case where, for example, a lane boundary line which should be a straight line has a zigzag shape. With regard to the determination process executed in response to extraction of the defective portion of the road marking, the present embodiment refers to the change information stored in the change information database 19 to perform the determination. For the location where the detective of the road marking is extracted, when the change information of the corresponding road location exists in the change information database 19, this makes it possible to estimate an occurrence of the defect in the real world. In this case, the correction of the road marking is not performed.

When the change information at the corresponding road location does not exist in the change information database 19, this makes it possible to estimate that the defective of the road marking is due to the noise at the image processing. In this case, the correction of the defective portion of the road marking is performed. In cases where the marking line (lane marking line, etc.) painting of the road has the lacking portion or the distorted portion, the correction on the lacking portion or the distorted portion is performed so as to provide smooth connection. Then, in step S8, the road map data is generated from the corrected combined images and written into the road map database 18. By the above processing, the latest and highly accurate road map data is generated.

The road map generation system 1 of the present embodiment as described above provides the following excellent effects. Specifically, the present embodiment, which generates the road map data based on collecting the camera image data of the vehicle-mounted cameras 4, performs the correction only in cases where it is determined that the defective portion of the road marking on the road extracted from the combined image is due to the noise at the image processing. In cases where an occurrence of the defect in the real world is determined in the determination step, the correction is not performed.

As a result, it is possible to generate accurate road map data that faithfully reflects the actual road conditions. Consequently, it possible to greatly contribute to preparation of highly accurate road map data for automated driving of automobiles. Further, the road map generation system 1 of the present embodiment can generate map data based on collecting camera image data of the vehicle-mounted cameras 4 of a large number of general vehicles A traveling on roads nationwide. Therefore, it is possible to generate highly accurate map data at low costs, as compared with cases where dedicated vehicles travel to obtain data.

When a change in the road marking over time at a same location is detected from the camera image data, the present embodiment stores information of this change in the change information database 19 in the process of accumulating and storing the road marking change. Further, in the process of determining whether the defective of the road marking defect is due to the noise at the image processing, the process refers to the change information stored in the change information database 19 to perform the determination. Therefore, it is possible to perform the process of the determination process easily and reliably.

Furthermore, an occurrence of, in the real world road, at least one of: a tire slip trace, re-paving, partial depression or bump, cracking, and abnormality due to disaster is a factor for determining the defect of the road marking, specifically, causes the lacking portion or the distorted portion of the road making in the real world. The present embodiment is configured to, in the detection process, detect at least one of: a tire slip trace on the road; re-paving; partial depression or bump; cracking; and a disaster-caused abnormality, as a pattern of the road marking change from the camera image data. By providing patterns of these changes in advance, it becomes possible to easily detect changes in road markings from the camera images.

In particular, the present embodiment extracts a defective portion or a distorted portion of the marking line painting on the road serving as a defective location, wherein the marking line painting serves as the road marking. In cases where the defective portion of the road marking is caused by the noise at the image processing, the correction on the lacking portion or the distorted portion is made to provide smooth connection. This makes it possible to make an appreciate correction on the lacking portion or the distorted portion caused by the image processing and it is possible to generate highly accurate map data.

Although the above described embodiment has such a configuration that the processing control unit 14 including a computer automatically executes various processes (steps) in the data center 2, a configuration may be such that processes may be semi-automatically executed which includes input instructions from an operator. With this, for determining whether there is an occurrence of a defect of a road marking in the real world for example, a display may display the camera image data and an operator can perform the determination via refereeing to the camera image data. Therefore, it is possible to easily confirm actual images and it is possible to make the determination accurately.

Although the above embodiment has such a configuration that the camera image data are collected from the vehicles A by wireless communications, a configuration may be such that the camera image data are collected via, for example, storage medium such as an SD card also. Additionally, a hardware configuration and the like of the vehicle (vehicle-mounted device) and/or the data center are modifiable in various ways.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A road map generation system that, from a plurality of vehicles equipped with vehicle cameras, collects camera image data of road conditions captured during traveling of the vehicles and generates road map data based on the camera image data, the system comprising:
  an image processing device that performs image processing on the collected camera image data to perform conversion into orthographic images viewed from directly above and to combine the orthographic images to generate a combined image;
  an extraction device that extracts a defective portion of a road marking on a road from the combined image;
  a determination device that performs a determination of whether the defective portion of the road marking is due to noise at the image processing of the image processing device or an occurrence of a defect in the real world; and
  a correction device that, based on a result of the determination by the determination device, performs a correction process of the road marking when the defective portion of the road marking is due to the noise at the image processing.

2. The road map generation system according to claim 1, wherein
  the determination device refers to the camera image data of the defective portion of the road marking to perform the determination.

3. The road map generation system according to claim 1, further comprising:
  a detection device that, from the camera image data, detects a change in the road marking over time at a same location; and
  a change information storage device that store change information on the change in the road marking detected by the detection device,
  wherein the determination device refers to the change information stored in the change information storage device to perform the determination.

4. The road map generation system according to claim 3, wherein
  from the camera image data, the detection device detects at least one of: a tire slip trace on a road; re-paving; partial depression or bump; cracking; and an abnormality due to a disaster occurrence, as a pattern of the change in the road marking.

5. The road map generation apparatus according to a claim 1, wherein:
  from the combined image, the extraction device extracts a lacking portion or a distorted portion of a marking line painting on the road as the defective portion of the road marking; and
  when the defective portion of the road marking is due to the noise at the image processing, the correction device corrects the lacking portion or the distorted portion of the marking line so as to provide smooth connection.

6. A road map generation method that, from a plurality of vehicles equipped with vehicle cameras, collects camera image data of road conditions captured during traveling of the vehicles and generates road map data based on the camera image data, the method comprising:
  performing image processing on the collected camera image data, including performing conversion into orthographic images viewed from directly above and combining the orthographic images to generate a combined image;
  extracting a defective portion of a road marking on a road from the combined image;
  performing a determination of whether the defective portion of the road marking is due to noise at the image processing or an occurrence of a defect in the real world; and
  based on a result of the determination, performing a correction process of the road marking when the defective portion of the road marking is due to the noise at the image processing.

7. The road map generation method according to claim 6, wherein
  performing the determination includes referring to the camera image data of the defective portion of the road marking.

8. The road map generation method according to claim 6, further comprising:
  from the camera image data, detecting a change in the road marking over time at a same location; and
  in response to detecting the change in the road marking, storing change information of the change in a change information storage device,
  wherein performing the determination includes referring to the change information stored in the change information storage device.

9. The road map generation method according to claim 8, wherein
  detecting the change includes, from the camera image data, detecting at least one of: a tire slip trace on a road; re-paving; partial depression or bump; cracking; and an abnormality due to a disaster occurrence, as a pattern of the change in the road marking.

10. The road map generation method according to claim 8, wherein:
  extracting the defective portion includes extracting a lacking portion or a distorted portion of a marking line painting on the road as the defective portion of the road marking from the combined image; and
  performing the correction process includes performing a correction on the lacking portion or the distorted portion of the marking line so as to provide smooth connection.

* * * * *